United States Patent [19]

Shimanaka et al.

[11] Patent Number: 5,103,692

[45] Date of Patent: Apr. 14, 1992

[54] AUTOMATIC TRANSMISSION AND ENGINE CONTROL SYSTEM

[75] Inventors: Shigeki Shimanaka, Kanagawa; Yuji Kato, Tokyo; Tatsuo Wakahara, Kanagawa; Hiroshi Asano, Kanagawa; Shinsuke Nakazawa, Kanagawa; Hiroshi Sasaki, Kanagawa; Hiroshi Yamaguchi, Kanagawa; Kazuhiro Ishigami, Kanagawa; Shinichi Takenouchi, Kanagawa, all of Japan

[73] Assignee: Nissan Motor Co., Ltd., Yokohama, Japan

[21] Appl. No.: 709,604

[22] Filed: Jun. 5, 1991

[30] Foreign Application Priority Data

Jun. 8, 1990 [JP] Japan .................................. 2-151417

[51] Int. Cl.$^5$ .............................................. B60K 41/06
[52] U.S. Cl. ....................................... 74/857; 74/858; 74/861
[58] Field of Search ........................... 74/857, 858, 861

[56] References Cited

U.S. PATENT DOCUMENTS

| | | | |
|---|---|---|---|
| 4,166,440 | 9/1979 | Helava et al. | 74/857 X |
| 4,403,527 | 9/1983 | Mohl et al. | 74/858 X |
| 4,724,723 | 2/1988 | Lockhart et al. | 74/857 X |
| 4,889,014 | 12/1989 | Iwata | 74/858 |
| 4,933,851 | 6/1990 | Ito et al. | 74/858 X |
| 4,938,100 | 7/1990 | Yoshimura et al. | 74/858 X |
| 4,939,956 | 7/1990 | Takizawa | 74/858 |

FOREIGN PATENT DOCUMENTS

0436977A2  7/1991  European Pat. Off. .
61-108886 10/1986  Japan .

Primary Examiner—Rodney H. Bonck
Assistant Examiner—Matthew Stavish
Attorney, Agent, or Firm—Lowe, Price, LeBlanc & Becker

[57] ABSTRACT

In order to determine a malfunction which results in the loss of torque reduction control, the engine speed and the torque converter characteristics are monitored when a torque down signal is issued. The maximum engine torque which should be produced under such circumstances is used to derive a corresponding maximum engine speed value. If the actual engine speed exceeds the estimated value, appropriate torque down control can be assumed to have been lost. In response a fail safe such as boosting line pressure to switching to an alternative source of torque control can implemented. A suitable warning signal can also be generated.

12 Claims, 5 Drawing Sheets

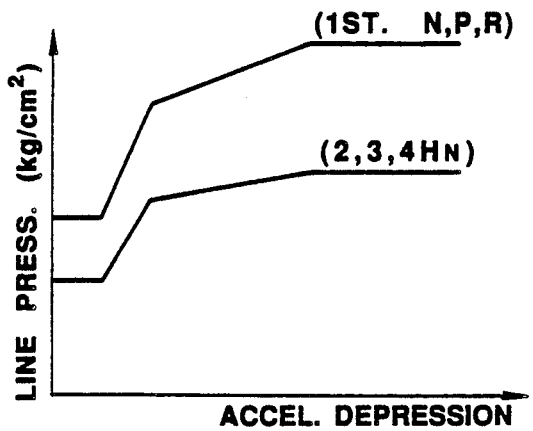
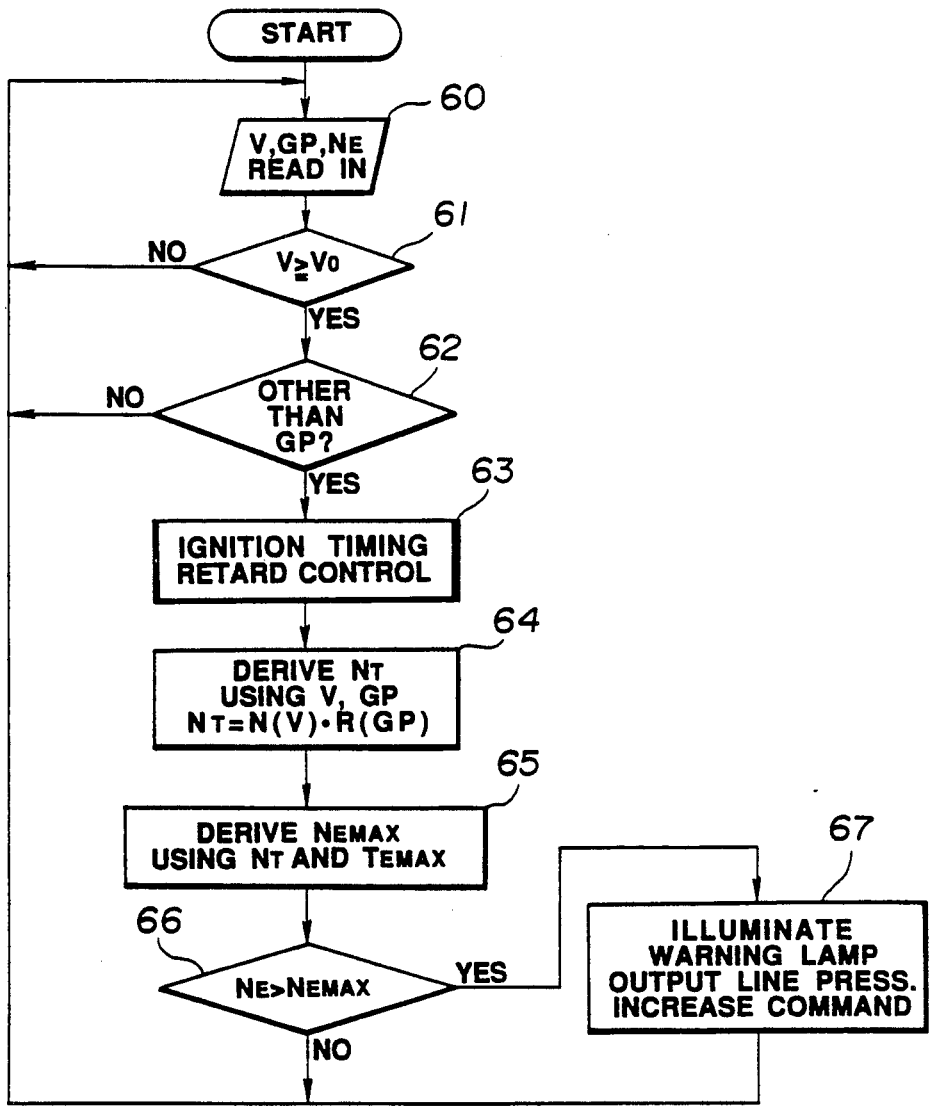

AUTOMATIC TRANSMISSION AND ENGINE CONTROL SYSTEM

BACKGROUND OF THE INVENTION

1. Field of the Invention

The present invention relates generally to a control system which controls the operation of both the engine and the transmission and more specifically to such a control system which includes a malfunction detection arrangement which enables the detection of inappropriate torque down control.

2. Description of the Prior Art

JU-A-61-108886 discloses a control arrangement of the type wherein, when the engagement of the friction elements is insufficient to transmit the amount of torque which is being produced by the engine, the ignition timing is adjusted in a manner to reduce the amount of torque being produced.

However, in systems wherein this measure is employed to reduce engine torque, in the case of a malfunction, the engine response to a given demand for engine power output (e.g. accelerator pedal depression) is such as to produce more torque than can be handled by the given friction element engagement to the degree that element slippage occurs.

Accordingly, when the engine torque reduction function is lost due to a control malfunction, it is necessary to inform the driver of the situation and to provide a fail-safe.

However, in the event that the engine throttle valve opening is small, even if the engine torque reduction control is lost, as the amount of torque which is being produced by the engine under such circumstances is very small the detection of a malfunction is rendered extremely difficult.

SUMMARY OF THE INVENTION

It is an object of the present invention to provide a system of the above described nature which is able to detect a malfunction even when the amount of torque which is being produced by the engine is below a predetermined level.

In brief, the above object is achieved by an arrangement wherein, in order to determine a malfunction which results in the loss of torque reduction control, the engine speed and the torque converter characteristics are monitored when a torque down signal is issued. The maximum engine torque which should be produced under such circumstances is used to derive a corresponding maximum engine speed value. If the actual engine speed exceeds the estimated value, appropriate torque down control can be assumed to have been lost. In response a fail safe such as boosting line pressure to switching to an alternative source of torque control can implemented. A suitable warning signal can also be generated.

More specifically, a first aspect of the present invention comes in the form of a control system for an automotive transmission and engine which features: means for reducing the amount of torque which is produced by the engine when the friction element engagement capacity is not sufficient to transmit the same; means for determining the engine speed and outputting a signal indicative thereof; means for determining the rotational speed of a torque converter turbine and outputting a signal indicative thereof; means for deriving a maximum engine torque value which would be produced during normal operation of the torque reducing means, and using this maximum engine torque value with the sensed turbine rotational speed to determine a maximum permissible engine speed; and means for comparing the determined maximum permissible engine speed with the sensed engine speed and for indicating that the engine torque reduction means is malfunctioning when the sensed engine speed exceeds the derived maximum permissible engine rotational value.

A second aspect of the present invention comes in the form of a diagnostic system for use in a vehicle which features: an internal combustion engine; a transmission having a friction element; a torque converter which operatively interconnects the crankshaft of the engine with an input shaft of the transmission, said torque converter having a turbine; friction element capacity determining means for determining the engagement capacity of the friction element and for outputting a engagement capacity signal indicative thereof; torque control means associated with said engine for means for selectively reducing the amount of torque which is produced by the engine in accordance with the engagement capacity signal; means for determining the engine speed and outputting a signal indicative thereof; means for determining the rotational speed of the torque converter turbine and outputting a signal indicative thereof; means for deriving a maximum engine torque value which would be produced during normal operation of the torque reducing means, and using this maximum engine torque value with the sensed turbine rotational speed to determine a maximum permissible engine speed; and means for comparing the determined maximum permissible engine speed with the sensed engine speed and for indicating that the engine torque reduction means is malfunctioning when the sensed engine speed exceeds the derived maximum permissible engine rotational value.

A third aspect of the present invention comes in the form of a method of operating a system including an internal combustion engine and a transmission which is operatively connected thereto by way of a torque converter having a turbine, which features the steps of: determining the torque output of the engine; determining the engagement capacity of a friction element included in the transmission; issuing a torque reduction signal in response to the engine torque output of the engine exceeding the engagement capacity of the friction element; determining the engine speed and producing a signal indicative thereof; determining the rotational speed of the torque converter turbine and producing a signal indicative thereof; deriving a maximum engine torque value which would be produced in response to the torque reduction signal; using this maximum engine torque value with the sensed turbine rotational speed to determine a maximum permissible engine speed; comparing the determined maximum permissible engine speed with the sensed engine speed; and indicating that the engine torque reduction signal is being improperly produced when the sensed engine speed exceeds the derived maximum permissible engine speed.

A further aspect of the present invention comes in a system including an internal combustion engine and a transmission which is operatively connected thereto by way of a torque converter having a turbine, the system featuring: means for determining the torque output of the engine; means for determining the engagement capacity of a friction element included in the transmission; means for issuing a torque reduction signal in response to the engine torque output of the engine exceeding the engagement capacity of the friction element; means for determining the engine speed and producing a signal indicative thereof; means for determining the rotational speed of the torque converter turbine and producing a signal indicative thereof; means for deriving a maximum engine torque value which would be produced in response to the torque reduction signal; means for using this maximum engine torque value with the sensed turbine rotational speed to determine a maximum permissible engine speed; means for comparing the determined maximum permissible engine speed with the sensed engine speed; and means for indicating that the engine torque reduction signal is being improperly produced when the sensed engine speed exceeds the derived maximum permissible engine speed.

BRIEF DESCRIPTION OF THE DRAWINGS

FIG. 4 is a graph which shows in terms of line pressure and accelerator pedal depression, the line pressure characteristics which are produced during normal malfunction free operation;

FIG. 5 is a flow chart which depicts the steps which are executed in order to determine if the ignition retard control is malfunctioning properly and implement a fail-safe in the event a malfunction is detected;

DETAILED DESCRIPTION OF THE PREFERRED EMBODIMENTS

Figure 1:
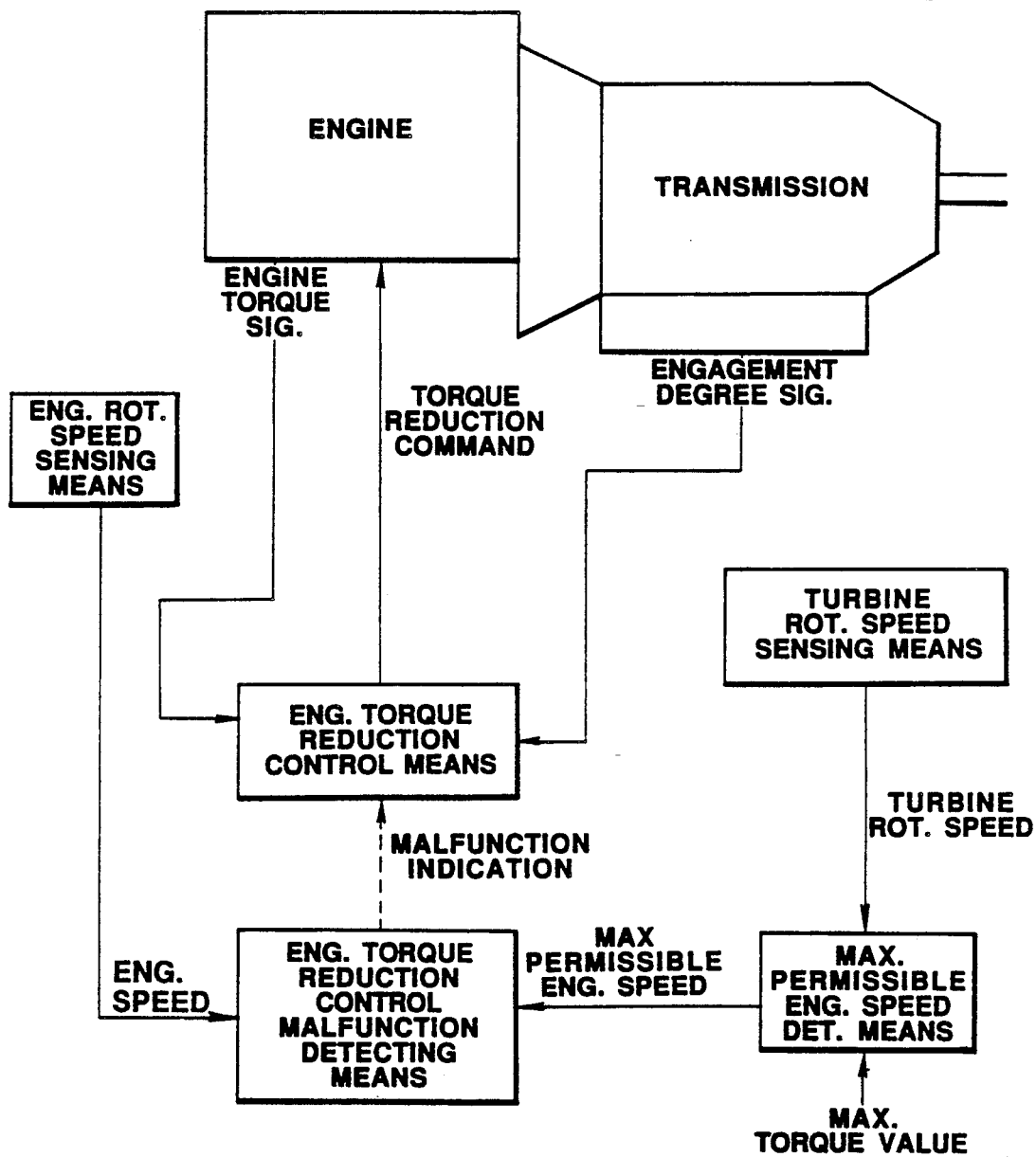
FIG. 1 is a schematic block diagram depicting the conceptual arrangement of an embodiment of the instant invention.
Figure 2:
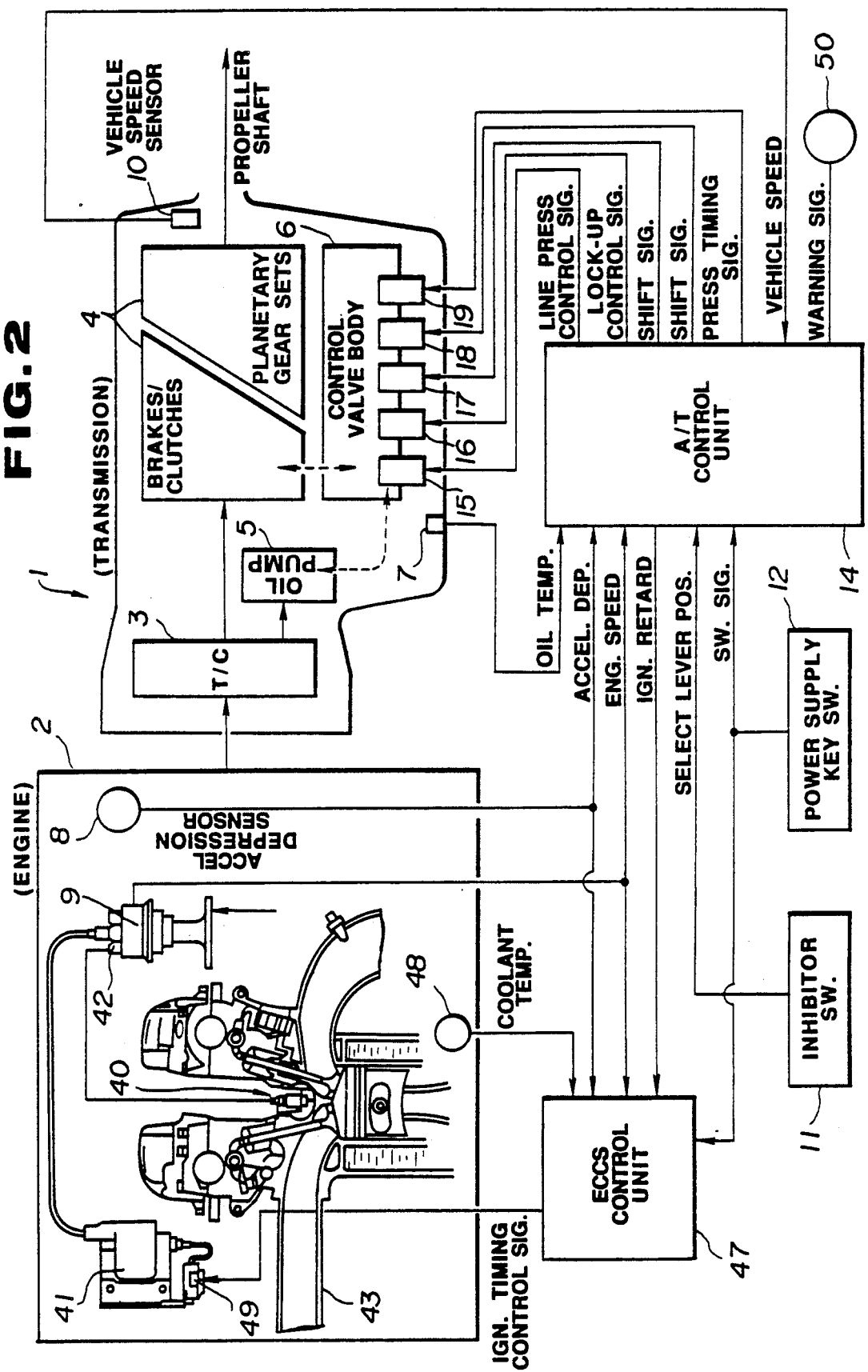
FIG. 2 is a schematic diagram showing an engine/transmission system to which the present invention is applied.

FIG. 2 shows an engine/transmission system to which the present invention is applied. In this system, a transmission 1 includes clutches and brakes and associated planetary gears (or the like) which are arranged to receive torque from an engine 2 by way of a torque converter 3. In this particular instance the transmission includes a gear train which is capable of producing four forward gears and one reverse.

The transmission further includes an oil pump 5 which is operatively connected with the friction elements by way a control valve body 6.

The electronic control which is associated with the above described arrangement includes data sources which comprise: an oil temperature sensor 7, a accelerator pedal depression degree sensor 8, a engine rotational speed sensor 9, a vehicle speed sensor 10, an inhibitor switch 11 and a power source key switch 12.

An A/T control unit 14 receives the data input from the above sources, computes and outputs signals which control the level of line pressure, shifting, lock-up and the like. As shown, these signals are applied to a line pressure control solenoid 15, a lock-up control solenoid 16, shift control solenoid A 17, shift control solenoid B 18 and timing solenoid 19, which are included in the control valve body 6.

The engine 2 includes spark plugs 40 (only one is shown), an ignition coil 41 and a distributor 42 which is adapted to function as the above mentioned engine speed sensor 9.

An ECCS type control unit 47 is operatively coupled with the power supply key switch 12, the accelerator pedal depression sensor 8, the engine rotational speed sensor 9 and an engine coolant temperature sensor 48. This unit 47 derives an advance angle value using a look-up technique wherein an appropriate value is read out from mapped data recorded in terms of crank angle (engine rotational speed) and fuel injection pulse width. The ignition timing control signal output of the ECCS control unit 47 is applied to a power transistor 49 which forms part of the ignition system. When the accelerator pedal depression degree indicates that the engine is idling or if the engine engine coolant temperature is indicated by sensor 48 as being below a predetermined level, the data used for the look-up is appropriately selected and the ignition timing is varied in a manner suitable for these modes of operation.

The A/T control unit 14 includes means for estimating the appropriate engine torque based on data which is recorded in terms of engine speed and accelerator pedal depression degree (engine load), and for deriving and generating signals which control the level of the line pressure and which friction elements are to be engaged under the instant set of circumstances.

The A/T control unit 14 further derives and outputs an ignition retard signal (torque down control signal) to the ECCS control unit 47 on the basis of the line pressure level and expected friction element engagement capacity.

Figure 3:
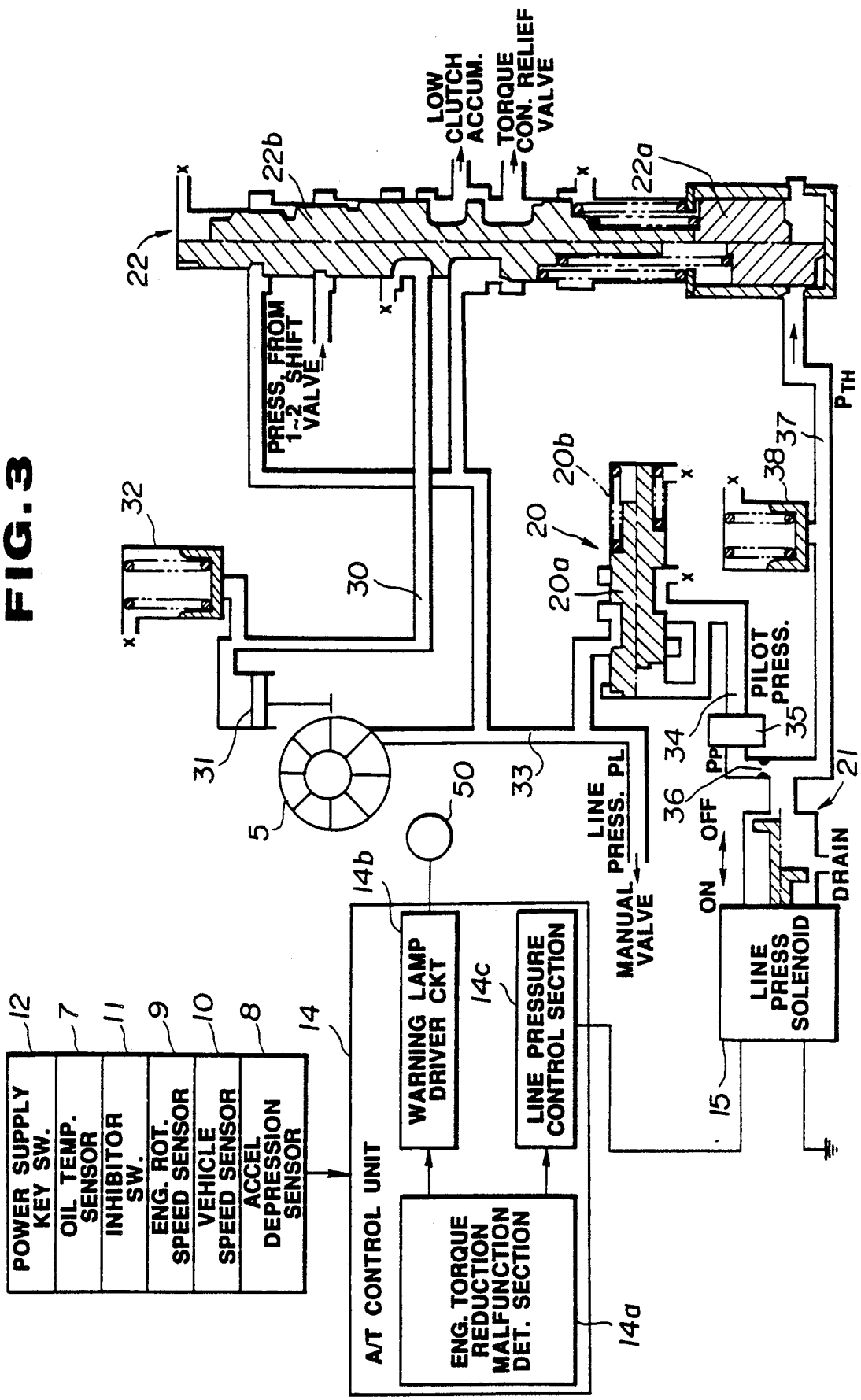
FIG. 3 is a partially schematic diagram showing the manner in which control of the transmission line pressure is achieved in accordance with an embodiment
Figure 6:
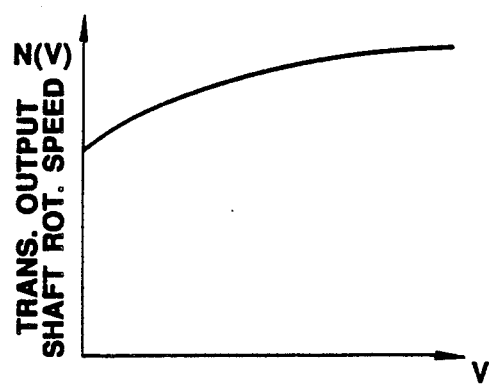
FIG. 6 is a graph which shows the relationship between vehicle speed and transmission output shaft rotational speed.

As schematically illustrated in FIG. 3, in accordance with the present invention the A/T control unit 14 further includes an engine torque reduction control malfunction detecting section (function), a warning lamp driver circuit 14b and a line pressure control section 14c.

The engine torque reduction control malfunction detection section 14a is such that the maximum engine torque TEMAX which can be expected under normal ignition retard control, is determined along with the actual vehicle speed V and the actual instant gear position GP. These values are used to determine the turbine rotational speed NT which should be observed under such conditions.

The NT value is then used to determine the maximum engine speed value NEMAX which should be observed under the instant set of conditions in order to prevent loss of friction element engagement.

If the instant engine speed NE as indicated by the output of the engine speed sensor 9, is such as to exceed this NEMAX value then it can be assumed that abnormal operation is taking place. In response to this detection, a warning is issued via the illumination of a suitable lamp (e.g. warning lamp 50) and at the same time the line pressure control is modified in a manner to issue a command to increase the level of line pressure as a safe guard.

FIG. 3 shows the line pressure control arrangement which is employed in the instant embodiment. This arrangement basically comprises an oil pump 5, a pilot valve 20, a throttle valve 21, a pressure regulator valve 22.

In this instance the oil pump 5 is of the variable capacity vane type, the rotor of which is placed in drive connection with the engine crank shaft by way of the torque converter drive sleeve. In order to suitably limit the output of the pump, a feedback pressure is supplied from the pressure regulator valve 22 by way of conduit 30, to a control cylinder 31. The piston which is reciprocatively disposed in the control cylinder is operatively connected with the rotor case of the pump 5.

A feedback accumulator 32 is fluidly communicated with the feedback pressure conduit 30.

The pilot valve 20 which includes a spool 20a and spring 20b, modifies the line pressure PL which is supplied thereto via conduit 33 in a manner to output a predetermined constant level pilot pressure PP.

An oil strainer 35 is disposed downstream of the pilot pressure valve 20 in the illustrated manner. The throttle valve 21 is fluidly communicated with the pilot pressure valve 20 via orifice 36 and arranged to modulate the pilot pressure PP in a manner to form a throttle pressure PTH which is supplied via conduit 37 to a control chamber at the base of the pressure regulator valve 22. A pressure modifier accumulator 38 is communicated with the conduit 37.

The pressure modifier valve 22 responds to changes in the throttle pressure PTH in a manner to vary the level of the line pressure PL which is output therefrom. In brief, as the level of the throttle pressure PTH increase the force which tends to bias the plug 22b (upwardly as seen in the drawings) and in a manner which increases the upward bias acting on the spool 22b and thus results in an increase in the level of line pressure PL.

As the operation of this particular type of pressure control is known to those skilled in the art and is not directly related to the concept on which the invention is based, no further disclosure will be given for brevity.

The A/T control unit 14 controls the level of line pressure in accordance with the selected transmission gear ratio as indicated by the inhibitor switch 11. In this case the gear ratios are divided into first and second groups. The first includes 1st N, P and R while the second includes 2nd, 3rd and 4th. Depending on the indicated gear position and the accelerator pedal depression degree, the basic driving conditions are determined and a duty cycle which is determined to induce the appropriate level of line pressure (see FIG. 4) is derived and applied to the line pressure solenoid 15. However, in the case a malfunction in the ignition timing control is discovered, the duty cycle is immediately varied to boost the line pressure level higher than that which would normally be applied.

The operation of the above described arrangement which detects a malfunction and which implements the line pressure increase (fail safe) is depicted in flow chart form in FIG. 5. The routine which is depicted in this figure is run in the control unit 14 in response to an indication that the amount of engine torque is apt to be excessive for the instant friction element engagement capacity. This routine can be run at predetermined intervals throughout the period the indication that torque down control is necessary.

The first step 60 of this routine is such as to read in the instant vehicle speed V, gear position GP and engine speed values, output by sensors 10, 11 and 9, respectively. Following this at step 61, the instant vehicle speed V is compared with a predetermined minimum velocity Vo. If the vehicle speed is equal to or greater than the Vo limit the routine goes on to step 62 wherein the output of the inhibitor switch 11 is checked. In the event that the instant gear ratio is other than neutral N and park P, indicating that transmission is conditioned to transmit torque, the routine flows to step 63 wherein, in the event that the estimated friction element engagement value does not match the estimated torque generation value, a sub routine is run to implement the required torque reduction via retardation of the ignition timing.

Following this, at step 64 the turbine rotational speed NT which will be occuring under the instant set of operating conditions is derived using the following equation:

$$NT = N(V) \cdot R(GP) \qquad (1)$$

wherein

Figure 7:
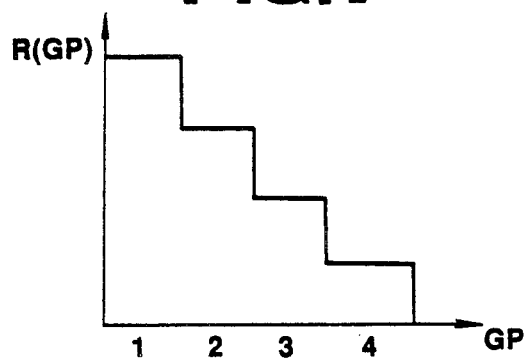
FIG. 7 is a graph which demonstrates the relationship which exists between shift lever position and gear ratio.

N(V) denotes the rotational speed of the transmission output shaft which produces the instant vehicle speed V; and R(GP) denotes the transmission gear ratio which will result from instant gear position (see FIG. 7).

At step 65 the maximum engine torque Temax which should be produced by the engine under the instant set of operating conditions given that the correct ignition timing was being applied, and the turbine rotational speed NT derived in the previous step, are used to estimate the engine speed value Nemax which should be observed for the instant Temax and NT conditions.

It should be noted that torque converter characteristics $\tau$ can be determined using the following equation:

$$\tau = \frac{T_E}{N_{ES}^2} \qquad (2)$$

wherein: TE denotes engine torque and NES denotes the engine stall speed.

A will be appreciated, as the ratio of the engine speed TE and the square of the engine stall speed NES (viz., $NES^2$) defines a constant, if the engine speed TE reduces, so should the engine stall speed N ES. It should be noted that NES should be equal to the engine speed at which the turbine speed becomes zero. If the value of NES is greater than this engine speed then the danger that friction element slip will take place, exists.

By re-arranging equation (2) we can obtain:

$$N_{ES}^2 = \frac{T_E}{\tau} \qquad (3)$$

Figure 8:
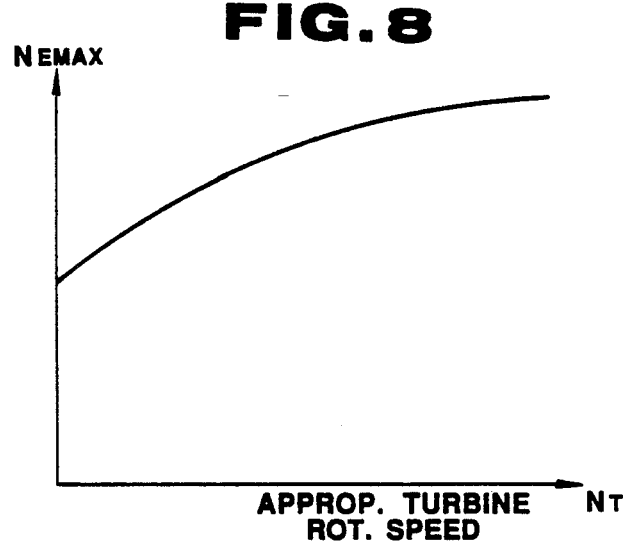
FIG. 8 is a graph which shows the relationship between engine speed and corresponding appropriate T/C turbine rotational speed.

If we substitute the maximum engine torque valve TEMAX for the TE and a $\tau$ value which has been corrected using the above derived NT value (viz., $\tau(NT)$), then we can obtain the permissible maximum engine speed value NEMAX (see FIG. 8).

At step 66 the engine speed NE as detected using the engine speed sensor 9, is compared with the NMAX value obtained in the previous step. In the event that NE≦NEMAX the ignition timing correction can be deemed to be correct and the routine is directed back to step 60. On the other hand, if NE>NEMAX then it is deemed that the ignition timing retard control is malfunctioning and the routine goes to step 67 wherein commands to energize the warming lamp 50 and boost the line pressure to provide a fail safe, are issued.

With the above described technique the following merits are derived:

1. It is possible to detect a malfunction in the ignition timing retard control by monitoring the torque converter characteristics $\tau(NT\ T)$ and the engine speed NE during a period when a torque down command is issued, and determining if the actual engine speed exceeds that which is predicted should be occuring for the maximum engine torque output which should be occuring under the circumstances.

2. When the torque reduction function via which the ignition timing retard control is effected is lost due to malfunction, a warning lamp 50 and is illuminated and at the same time, the line pressure level is boosted. The lamp brings the driver's attention to the fact that a malfunction has occured and at the same time the level of line pressure is increased to a level which ensures that slippage of the friction elements will be minimized.

It should be noted that the invention is not limited to the exact apparatus described hereinabove and that various modification can be made without departing from the scope of the same.

For example, even though the present invention has been described as using ignition timing control to implement torque reduction control, it is within the scope of the present invention to employ fuel cut, throttle valve closure and the like to achieve the same.

The above described invention includes a fail safe wherein the line pressure is arbitrarily boosted upon a malfunction is detected. However, it is possible switch the torque reduction control to a different mode upon the detection of ignition timing technique being detected has having malfunctioned. That is to say, it is possible that a number of torque reduction controls and to switch to a different control upon one malfunctioning. In this instance it is possible to eliminate the driver warning signal.

Further, even though the instant embodiment is such that the vehicle speed and the transmission gear position have been used to derive a turbine rotational speed value, it is possible to use a sensor to directly sense the same.

What is claimed is:

1. In a control system for an automotive transmission and engine
   means for reducing the amount of torque which is produced by the engine when the friction element engagement capacity is not sufficient to transmit the same;
   means for determining the engine speed and outputting a signal indicative thereof;
   means for determining the rotational speed of a torque converter turbine and outputting a signal indicative thereof;
   means for deriving a maximum engine torque value which would be produced during normal operation of the torque reducing means, and using this maximum engine torque value with the determined turbine rotational speed to derive a maximum permissible engine speed; and
   means for comparing the determined maximum permissible engine speed with the determine engine speed and for indicating that the engine torque reduction means is malfunctioning when the determined engine speed exceeds the derived maximum permissible engine speed.

2. A diagnostic system for use in a vehicle which comprises:
   an internal combustion engine;
   a transmission having a friction element;
   a torque converter which operatively interconnects the crankshaft of the engine with an input shaft of the transmission, said torque converter having a turbine;
   friction element capacity determining means for determining the engagement capacity of the friction element and for outputting a engagement capacity signal indicative thereof;
   torque reducing means associated with said engine for selectively reducing the amount of torque which is produced by the engine in accordance with the engagement capacity signal;
   means for determining the engine speed and outputting a signal indicative thereof;
   means for determining the rotational speed of the torque converter turbine and outputting a signal indicative thereof;
   means for deriving a maximum engine torque value which would be produced during normal operation of the torque reducing means, and using this maximum engine torque value with the determined turbine rotational speed to derive a maximum permissible engine speed; and
   means for comparing the determined maximum permissible engine speed with the determined engine speed and for indicating that the engine torque reduction means is malfunctioning when the determined engine speed exceeds the derived maximum permissible engine rotational value.

3. In a method of operating a system including an internal combustion engine and a transmission which is operatively connected thereto by way of a torque converter having a turbine, the steps comprising:
   determining the torque output of the engine;
   determining the engagement capacity of a friction element included in the transmission;
   issuing an engine torque reduction signal in response to the engine torque output exceeding the engagement capacity of the friction element;
   determining the engine speed and producing a signal indicative thereof;
   determining the rotational speed of the torque converter turbine and producing a signal indicative thereof;
   deriving a maximum engine torque value which would be produced in response to the engine torque reduction signal;
   using this maximum engine torque value with the determined turbine rotational speed to derive a maximum permissible engine speed;
   comparing the determined maximum permissible engine speed with the determined engine speed; and
   indicating that the engine torque reduction signal is being improperly produced when the determined engine speed exceeds the derived maximum permissible engine speed.

4. A method as claimed in claim 3 further comprising the step of implementing a fail safe in response to the engine torque reduction signal being indicated as being improperly produced.

5. A method as claimed in claim 4 wherein the step of implementing a fail safe comprises raising the level of a hydraulic pressure via which the friction element is engaged.

6. A method as claimed in claim 4 wherein the step of implementing a fail safe comprises switching the generation of the engine torque reduction signal from the instant source to a different source.

7. A method as claimed in claim 4 wherein the step of implementing a fail safe is accompanied by the issuance of a warning signal.

8. A system including an internal combustion engine and a transmission which is operatively connected thereto by way of a torque converter having a turbine comprising:

means for determining the torque output of the engine;

means for determining the engagement capacity of a friction element included in the transmission;

means for issuing an engine torque reduction signal in response to the engine torque output exceeding the engagement capacity of the friction element;

means for determining the engine speed and producing a signal indicative thereof;

means for determining the rotational speed of the torque converter turbine and producing a signal indicative thereof;

means for deriving a maximum engine torque value which would be produced in response to the engine torque reduction signal;

means for using this maximum engine torque value with the determined turbine rotational speed to derived a maximum permissible engine speed;

means for comparing the determined maximum permissible engine speed with the determined engine speed; and means for indicating that the engine torque reduction signal is being improperly produced when the determined engine speed exceeds the derived maximum permissible engine speed.

9. A system as claimed in claim 8 further comprising means for implementing a fail safe in response to the engine torque reduction signal being indicated as being improperly produced.

10. A system as claimed in claim 8 further comprising fail safe means for raising the level of a hydraulic pressure via which the friction element is engaged in response to the engine torque reduction signal being indicated as being improperly produced.

11. A system as claimed in claim 8 further comprising means for switching the generation of the engine torque reduction signal from the instant engine torque reduction means to a different control source in response to the engine torque reduction signal being indicated as being improperly produced.

12. A system as claimed in claim 8 further comprising means for issuing a warning signal in response to the engine torque reduction signal being indicated as being improperly produced.

* * * * *